US008835029B2

(12) United States Patent
Ellis-Monaghan et al.

(10) Patent No.: US 8,835,029 B2
(45) Date of Patent: Sep. 16, 2014

(54) FUSE FOR THREE DIMENSIONAL SOLID-STATE BATTERY

(75) Inventors: John J. Ellis-Monaghan, Grand Isle, VT (US); Jeffrey P. Gambino, Westford, VT (US); Kirk D. Peterson, Jericho, VT (US); Jed H. Rankin, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 13/252,366

(22) Filed: Oct. 4, 2011

(65) Prior Publication Data

US 2013/0084476 A1 Apr. 4, 2013

(51) Int. Cl.
*H01M 6/40* (2006.01)
*H01M 10/04* (2006.01)
*H01M 10/42* (2006.01)

(52) U.S. Cl.
CPC .......... *H01M 10/04* (2013.01); *Y02E 60/12* (2013.01); *H01M 10/42* (2013.01)
USPC .......................................................... 429/61

(58) Field of Classification Search
None
See application file for complete search history.

(56) References Cited

U.S. PATENT DOCUMENTS

| | | | |
|---|---|---|---|
| 4,252,869 A | 2/1981 | Heitz et al. | |
| 5,673,028 A | 9/1997 | Levy | |
| 5,993,993 A | 11/1999 | Hall | |
| 6,919,725 B2 | 7/2005 | Bertness et al. | |
| 7,132,832 B2 | 11/2006 | Vaillancourt et al. | |
| 7,468,221 B2 | 12/2008 | LaFollette et al. | |
| 7,717,968 B2 | 5/2010 | Kalynushkin et al. | |
| 7,902,518 B2 | 3/2011 | Ballard et al. | |
| 2009/0297892 A1* | 12/2009 | Ijaz et al. | 429/7 |
| 2010/0075181 A1 | 3/2010 | Niessen et al. | |
| 2010/0233548 A1 | 9/2010 | Pijnenburg et al. | |

FOREIGN PATENT DOCUMENTS

JP 10304576 A 11/1998

OTHER PUBLICATIONS

Baggetto, Loic et al. "On the route toward 3D-integrated all-solid-state micro-batteries." Solid State Technology vol. 51, No. 8, pp. 30-35, Aug. 2008.
Notten, Peter H.L. "3D-integrated all-solid-state batteries," Europhysics News, vol. 42, No. 3 (May-Jun. 2011), Published online: Jun. 10, 2011, pp. 24-29. <http://www.europhysicsnews.org> DOI: 10.1051/epn/2011303.

* cited by examiner

*Primary Examiner* — Patrick Ryan
*Assistant Examiner* — Wyatt McConnell
(74) *Attorney, Agent, or Firm* — Anthony Canale; David Zwick

(57) ABSTRACT

A solid-state battery structure having a plurality of battery cells formed in a substrate, method of manufacturing the same and design structure thereof are provided. The battery structure includes a patterned cathode electrode layer formed upon the substrate and structured to form a plurality of sub-arrays of the battery cells. The battery structure further includes a plurality of fuse wires structured to interconnect at least two adjacent sub-arrays. At least one of the plurality of fuse wires is structured to be blown to disconnect an interconnection having a defective sub-array. Advantageously, the plurality of fuse wires is an integral part of the battery structure.

18 Claims, 9 Drawing Sheets

FUSE FOR THREE DIMENSIONAL SOLID-STATE BATTERY

BACKGROUND

Field of the Invention

The present invention relates to solid-state batteries, and more particularly, to a fuse for a solid-state battery, method of manufacturing the same and design structure thereof.

An electrochemical battery is a device that converts chemical energy into electrical energy. An electrochemical battery typically consists of a group of electric cells that are connected to act as a source of direct current. Generally, an electric cell consists of two dissimilar substances, a positive electrode, typically called the cathode, a negative electrode, typically called the anode, and a third substance, an electrolyte. The positive and negative electrodes conduct electricity. The electrolyte acts chemically on the electrodes. The two electrodes are connected by an external circuit, such as a piece of wire. The electrolyte functions as an ionic conductor for the transfer of the electrons between the electrodes. Thus, a cell is a galvanic unit that converts chemical energy (ionic energy) to electrical energy.

Electrochemical energy sources based on solid-state electrolytes are known in the art. These (planar) energy sources, or 'solid-state batteries', efficiently convert chemical energy into electrical energy and can be used as the power sources for portable electronics. At small scale such batteries can be used to supply electrical energy to, for example, microelectronic modules. Small-sized integrated batteries are expected to become increasingly important in our daily lives as new application areas arise like implantable devices, small autonomous devices, smart cards, integrated lighting solutions (OLEDs) or hearing aids. These low-power and small-volume applications require batteries with a large volumetric energy/power density. The gravimetric energy/power density is of minor importance due to the small size. Therefore, excellent candidates to power these applications are thin-film all solid-state batteries.

Currently, several designs of three dimensional (3D) integrated batteries have already been described and disclosed in the prior art. According to some of these designs, the solid-state battery can be implemented as a thin-film battery in a trench array, which is etched into a silicon substrate, as shown in FIG. 1. One of the problems associated with this type of solid-state batteries is that all of the cells are connected together by one cathode plate. Thus, a defect in a trench may cause a failure of the whole battery.

Accordingly, it is desirable to provide 3D solid-state battery structures and method for fabricating those battery structures with improved yield and reliability.

SUMMARY

In an aspect of the invention, a battery structure comprises a plurality of battery cells formed in a substrate. The battery structure further comprises a patterned cathode electrode layer formed upon the substrate and structured to form a plurality of sub-arrays of the battery cells. The battery structure further comprises a plurality of fuse wires structured to interconnect at least two adjacent sub-arrays. At least one of the plurality of fuse wires is structured to be blown to disconnect an interconnection having a defective sub-array.

In another aspect of the invention, a battery structure comprises a plurality of battery cells formed in a substrate. The battery structure further comprises a patterned cathode electrode layer formed upon the substrate and structured to form a plurality of sub-arrays of the battery cells. The battery structure further comprises a plurality of fuse wires structured to interconnect the sub-arrays. At least one of the plurality of fuse wires is structured to be blown to disconnect a single defective sub-array.

In another aspect of the invention, a method for fabricating a battery structure comprises forming a plurality of battery cells in a substrate. The method further comprises forming a cathode electrode layer overlying the plurality of battery cells. The method further comprises patterning the cathode electrode layer to define a plurality of sub-arrays of the battery cells. The method further comprises forming a plurality of fuse wires structured to interconnect at least two adjacent sub-arrays. At least one of the plurality of fuse wires is structured to be blown to disconnect an interconnection having a defective sub-array.

In another aspect of the invention, a method for fabricating a battery structure comprises forming a plurality of battery cells in a substrate. The method further comprises forming a cathode electrode layer overlying the plurality of battery cells. The method further comprises patterning the cathode electrode layer to define a plurality of sub-arrays of the battery cells. The method further comprises forming a plurality of fuse wires structured to interconnect the sub-arrays. At least one of the plurality of fuse wires is structured to be blown to disconnect a single defective sub-array.

In another aspect of the invention, a design structure embodied in a machine readable medium for designing, manufacturing, or testing an integrated circuit is provided. The design structure comprises the structures and/or methods of the present invention.

A more complete understanding of the present invention, as well as further features and advantages of the present invention, will be obtained by reference to the following detailed description and drawings. It is to be understood that both the foregoing general description and the following detailed description are exemplary and explanatory only, and should not be considered restrictive of the scope of the invention, as described and claimed. Further, features or variations may be provided in addition to those set forth herein. For example, embodiments of the invention may be directed to various combinations and sub-combinations of the features described in the detailed description.

BRIEF DESCRIPTION OF THE SEVERAL VIEWS OF THE DRAWINGS

The present invention is described in the detailed description which follows in reference to the noted plurality of drawings by way of non-limiting examples of exemplary embodiments of the present invention.

DETAILED DESCRIPTION

The present invention relates to a structure of a solid-state battery on a substrate, method of manufacturing the same and design structure thereof. More specifically, the present invention comprises a battery structure having a plurality of battery cells formed in a substrate. The battery structure further comprises a patterned cathode electrode layer formed upon the substrate and structured to form a plurality of sub-arrays of the battery cells. The battery structure further comprises a plurality of fuse wires structured to interconnect at least two adjacent sub-arrays. At least one of the plurality of fuse wires is structured to be blown to disconnect an interconnection having a defective sub-array. Advantageously, the plurality of fuse wires is an integral part of the battery structure.

The structure of the present invention is an improvement over the prior art as it allows for testing of battery cells for defects prior to packaging. Once at least one defective sub-array of cells is identified, a fuse blow operation may be performed to disconnect one or more defective sub-arrays. Thus, the present invention provides an improvement in the yield and reliability of a solid-state battery since defective sub-arrays of cells may be removed prior to packaging of the solid-state battery.

Figure 1:
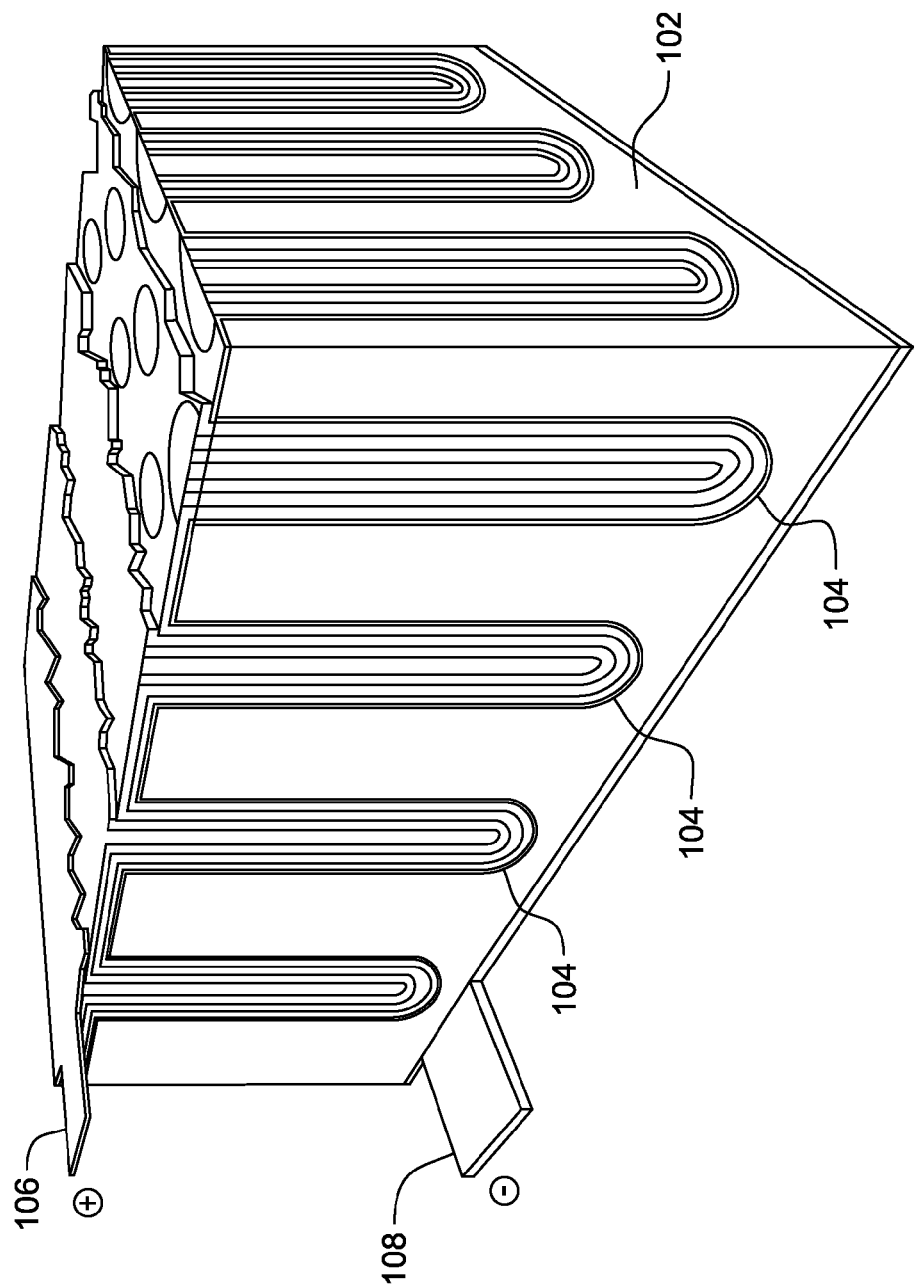
FIG. 1 illustrates a perspective view of a solid-state battery in a semiconductor substrate according to the prior art.

FIG. 1 illustrates a perspective view of a 3D-integrated all-solid-state battery in a semiconductor substrate according to the prior art. In this example, the substrate is made of silicon. This battery system is based on the intercalation of lithium ions as energy-carrying particles because silicon is an excellent intercalation material for lithium. The term "intercalation", as used herein, refers to a property of a material that allows ions to readily move in and out of the material without the material changing its phase. Accordingly, a solid-state intercalation film remains in a solid state during discharging and charging of a battery. As shown in FIG. 1, a substrate 102 is provided in which a plurality of cells 104 are formed by anisotropically (vertically) etching a plurality of trenches and subsequently depositing the active battery layers inside these cells using conventional techniques. The known 3-D integrated battery structure depicted in FIG. 1 further comprises first current collector layer 108 and second current collector layer 106. By means of the current collectors 106 and 108 the battery shown in FIG. 1 can easily be connected to an electronic device.

Figure 2:
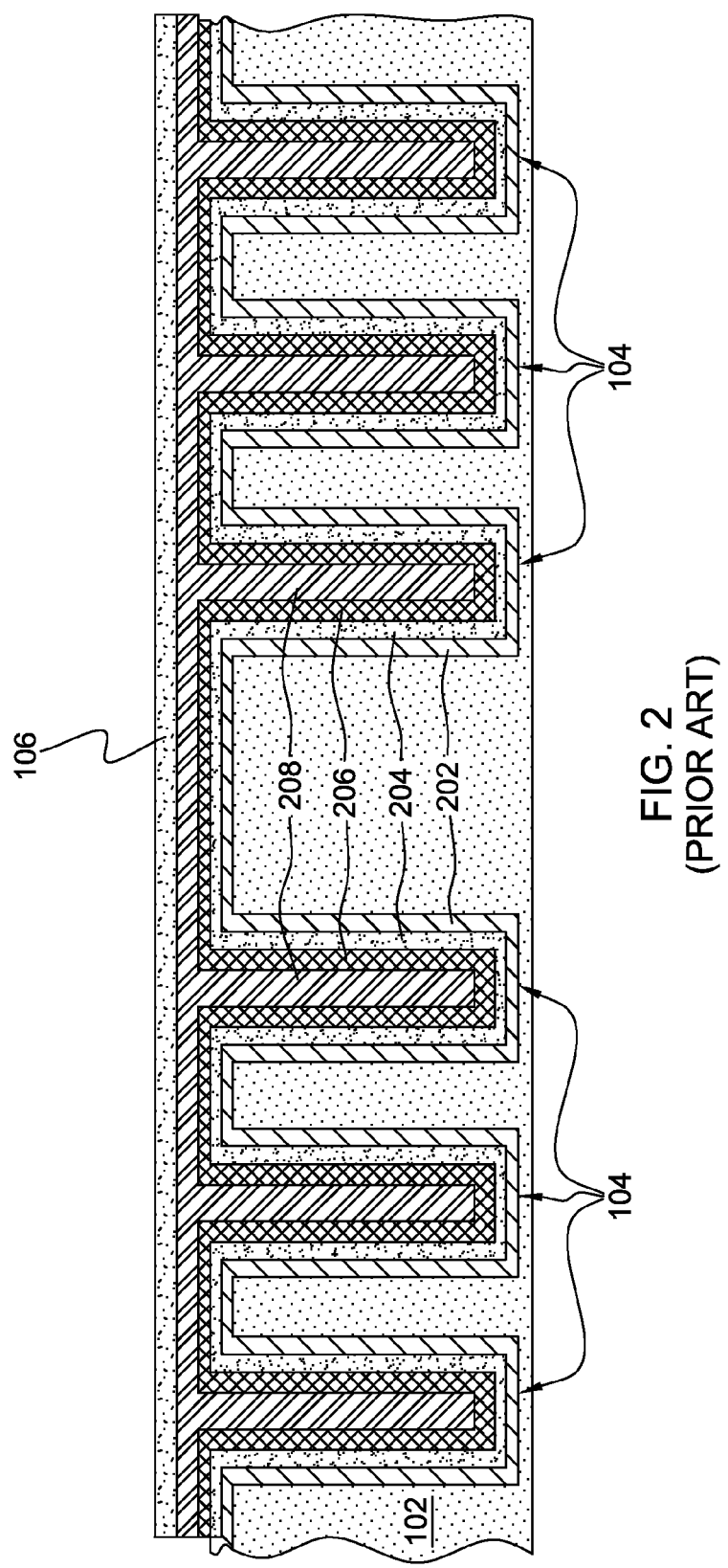
FIG. 2 illustrates a cross-section view of the solid-state battery structure of FIG. 1.

FIG. 2 illustrates a cross-section view of the solid-state battery structure of FIG. 1. Once trenches 104 are formed in substrate 102, a barrier layer 202 is deposited on sidewalls and the bottom of trenches 104. Barrier layer 202 may also be deposited onto the surface of substrate 102 in between trenches 104. Examples of barrier layer materials include refractory metals and refractory metal nitrides, such as tantalum (Ta), tantalum nitride (TaN), titanium (Ti), titanium nitride (TiN), tungsten (W), molybdenum (Mo) and combinations thereof. The barrier layer may be deposited by chemical vapor deposition (CVD), physical vapor deposition (PVD) or atomic layer deposition (ALD). In this example, barrier layer 202 may be deposited to a thickness of approximately 10-5000 nm, and preferably approximately 100 nm. The conductive barrier layer 202 acts as a chemical barrier, since the layer counteracts diffusion of lithium ions. In case lithium ions would leave cells 104 and would enter substrate 102 the performance of the battery would be affected. In this example, barrier layer 202 also acts as a first current collector 108 for the anode. The battery depicted in FIG. 2 further comprises an anode electrode layer 204 which may be deposited onto barrier layer 202. In this example, anode electrode 204 is made of a polycrystalline silicon film. Polycrystalline silicon 204 may be deposited by CVD to a thickness of approximately 10-5000 nm, and preferably approximately 1000 nm. As previously indicated, the anode will be the negative electrode of the battery. After that, the solid-state electrolyte layer 206 may be deposited onto anode layer 204. In this example, the solid-state electrolyte material (electrical insulating material) is lithium phosphorous oxynitride (LiPON). However, other ionically conductive solid-state electrolyte materials may be applied, for example, but not limited to lithium germanium oxynitride (LiGeON), lithium orthotungstate ($Li_2WO_4$), lisicon ($Li_{14}ZnGe_4O_{16}$), and the like. The layer thickness of the solid-state electrolytic layer 206 is approximately 50-5000 nm, and preferably approximately 100 nm. Deposition of the electrolyte layer 206 may be realized by means of the one of the following techniques: PVD, CVD, or ALD techniques. The battery further comprises a cathode electrode layer 208 which may be deposited onto the solid-state electrolyte layer 206. In this example, cathode layer 208 is made of a thin film material like lithium-cobalt composite oxide ($LiCoO_2$). Cathode electrode layer 208 may be deposited by CVD to a thickness of approximately 50-5000 nm, and preferably approximately 1000 nm. Examples of other cathode materials that may be applied include, but are not limited to, conducting oxides, such as $V_2O_5$, $LiMn_2O_4$, $LiFePO_4$. The battery shown in FIG. 2 further comprises a second current collector layer 106 which may be deposited on top of the cathode electrode layer 208. This layer acts as a current collector for cathode electrode layer 208. Preferably, this second current collector layer 106 is made of at least one of the following metals: aluminum (Al), nickel (Ni), platinum (Pt), gold (Au), silver (Ag), copper (Cu), tantalum (Ta), tantalum nitride (TaN), titanium (Ti), titanium nitride (TiN), and combinations thereof. Second current collector layer 106 may be deposited by PVD or CVD process to a thickness of approximately 0.1-5 μm, and preferably approximately 1 μm.

During a charge of the battery lithium ions plus an equal number of electrons ($Li^++e^-=Li$) are extracted from the cathode electrode layer 208 and transported via the solid-state electrolyte 206 to the anode electrode layer 204 where they are intercalated. During discharge the opposite process takes place.

The present invention recognizes that one of the substantial risks with this type of solid-state battery is that all of the cells 104 are connected together by one continuous cathode layer 208. A defect in the solid-state electrolyte layer 206 of any cell 104 may result in short-circuiting of the anode 204 and cathode 208. Thus, if anyone of the cells 104 used in a battery array becomes faulty due to such an internal shortage or the like, it will cause the whole battery array to become unusable. The various embodiments of the present invention provide a structure and method of forming a solid-state battery with an improved yield and reliability.

Figure 3:
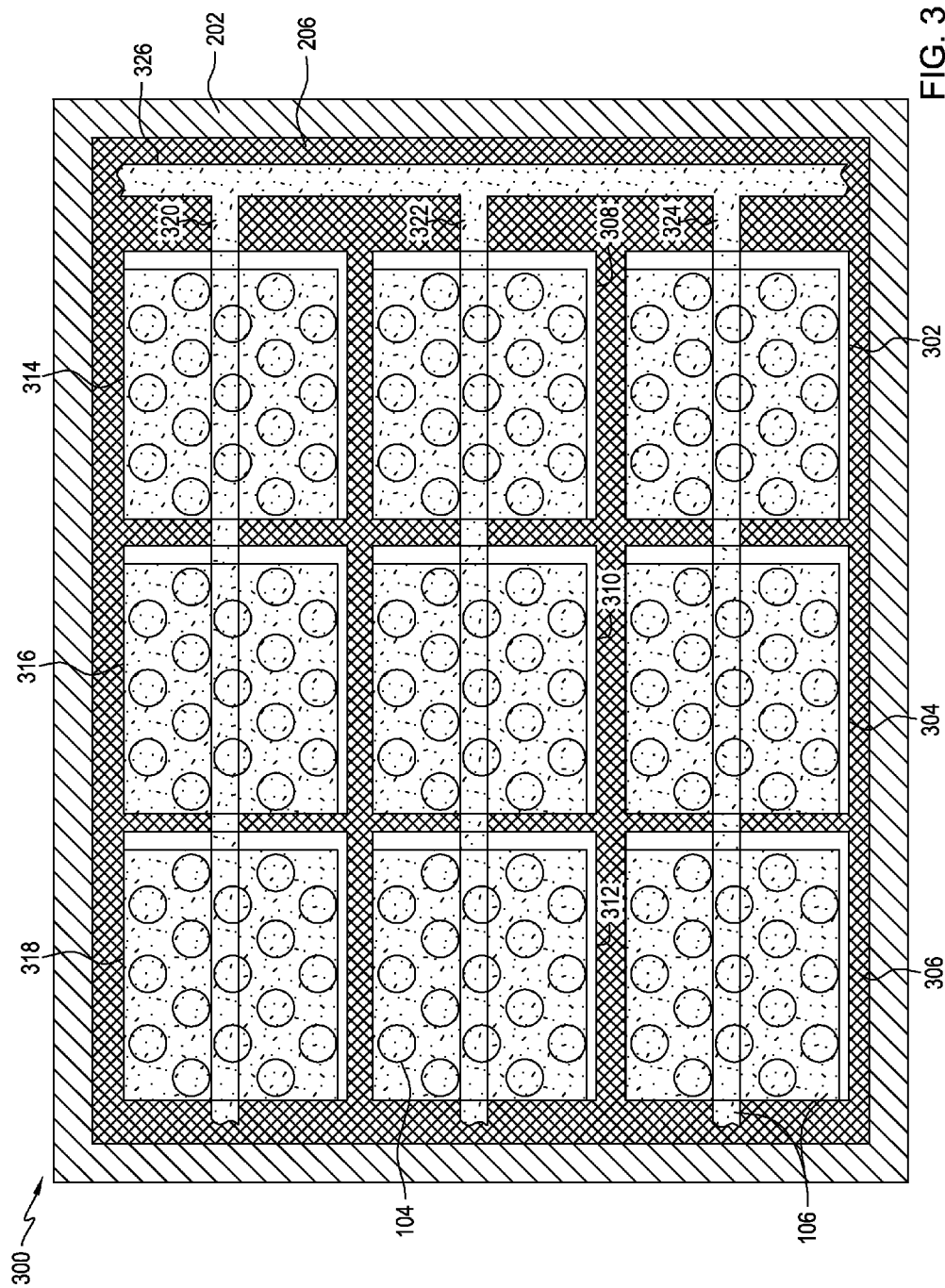
FIG. 3 illustrates a top view of a solid-state battery structure in accordance with an embodiment of the present invention.
Figure 5:
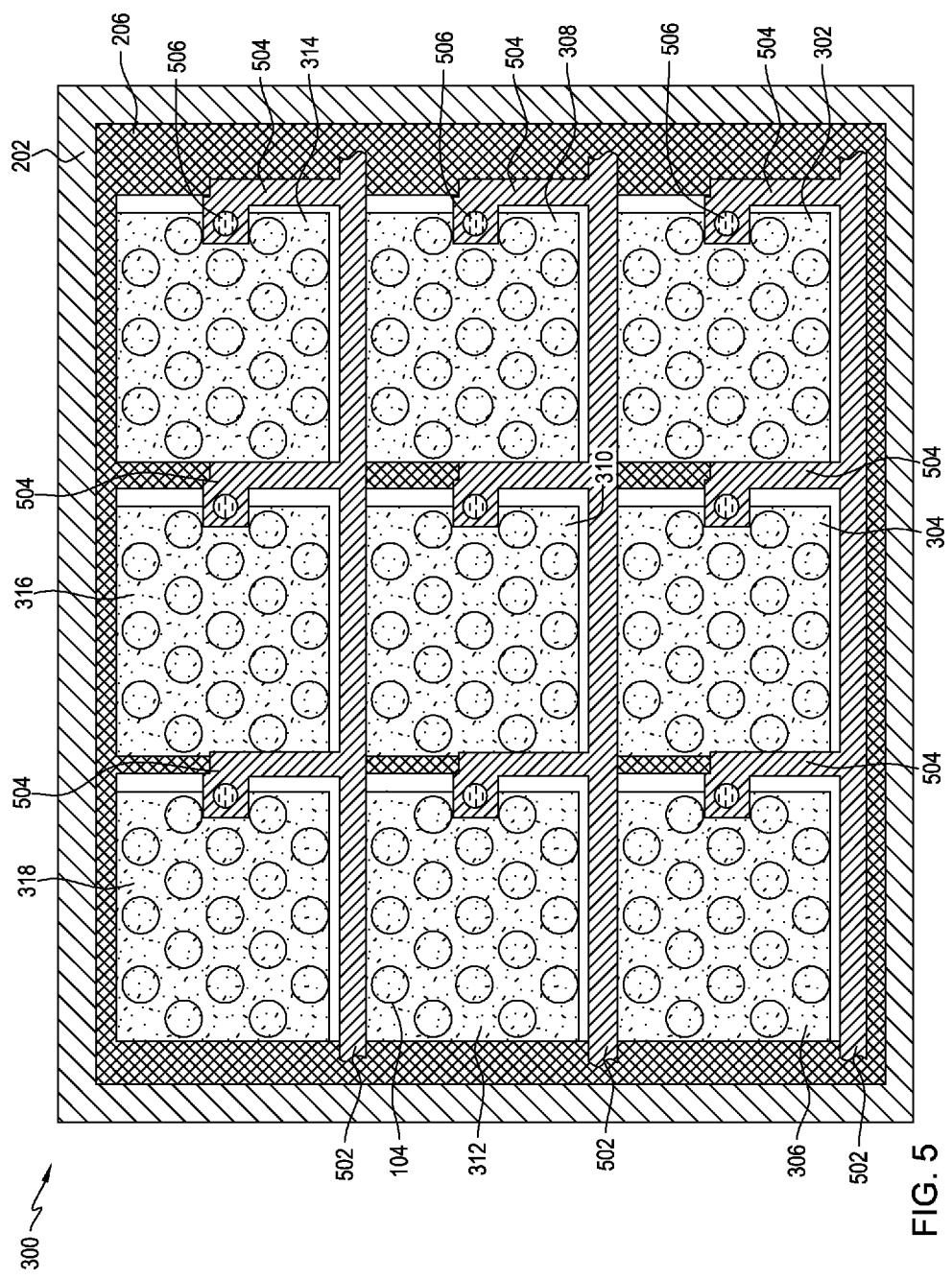
FIG. 5 illustrates a top view of a solid-state battery structure in accordance with another embodiment of the present invention.
Figure 7:
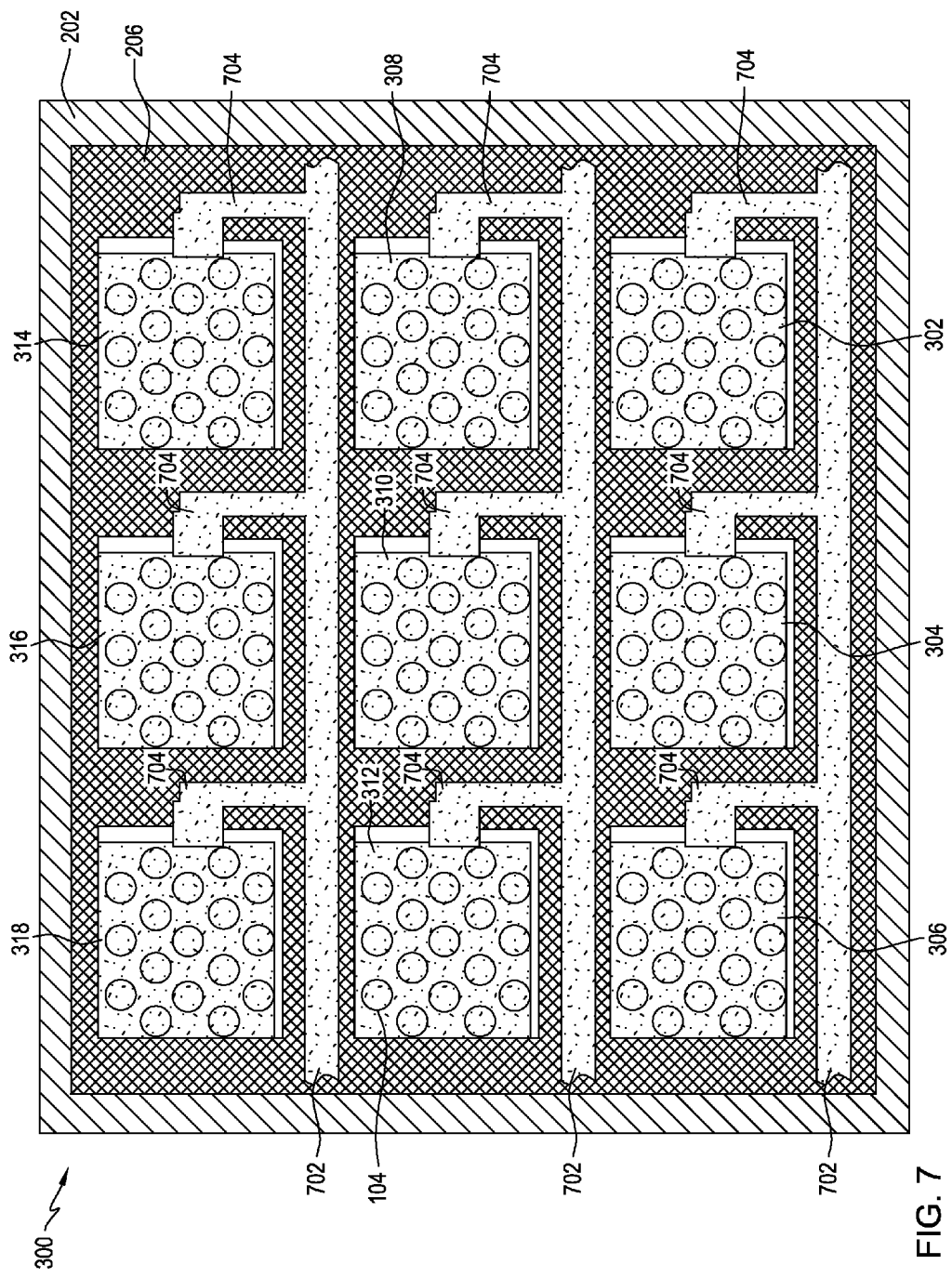
FIG. 7 illustrates a top view of a solid-state battery structure in accordance with yet another embodiment of the present invention.

FIG. 3 illustrates a top view of a solid-state battery structure in accordance with an embodiment of the present invention. This embodiment of the present invention provides a fuse connection structure integrated with the battery. The present invention also provides an aspect of a patterned cathode. These two aspects enable one to remove some defective cells 104 in the battery array 300 without making whole battery unusable. FIG. 3 illustrates a battery cell array 300 divided into a plurality of sub-arrays 302 to 318 arranged in matrix form (having a plurality of rows and columns). Although only 3 rows and 3 columns are shown in FIGS. 3, 5, and 7, the array 300 in FIGS. 3, 5, and 7 can have any number of rows and columns.

Figure 4:
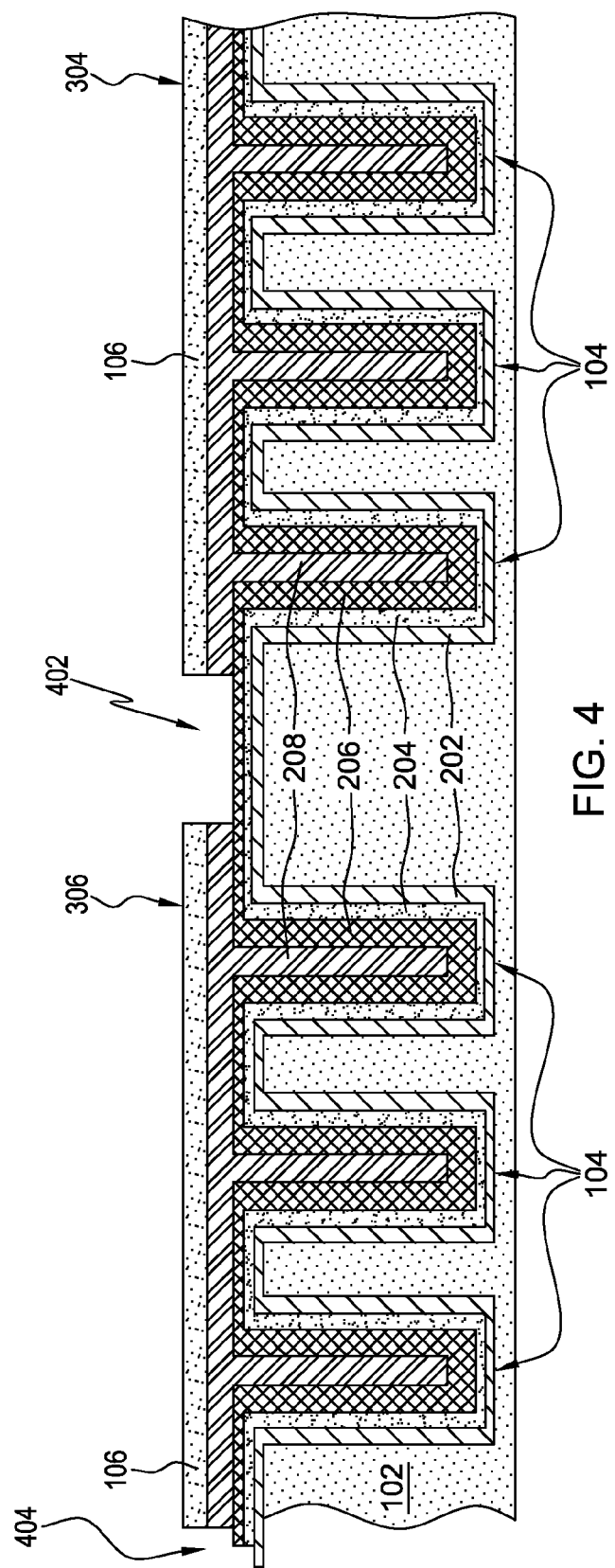
FIG. 4 illustrates a cross-section view of the solid-state battery structure of FIG. 3.

FIG. 4 illustrates a cross-section view of the solid-state battery structure of FIG. 3. It should be noted that in the conventional solid-state battery structure depicted in FIG. 2 the solid-state electrolyte layer 206 is covered with a continuous layer of the cathode material 208 which may be formed substantially across substrate 102. Furthermore, second current collector layer 106 overlying the cathode electrode layer 208 may be substantially continuous as well. The present invention, however, contemplates that cathode electrode layer 208 and second current collector layer 106 will be patterned in accordance with a predetermined arrangement of sub-arrays 302 to 318 within a battery cell array 300. FIG. 4 illustrates a cross-section of only two sub-arrays, namely 304 and 306. However, all sub-arrays preferably have identical structure. As shown in FIG. 4, portions of cathode electrode layer 208 and second current collector layer 106 are removed to define each sub-array.

The patterned cathode shown in FIG. 4 can be formed by various means. For example, standard etch and photolithography can be employed to form the patterned cathode layer 208. Once continuous layers of cathode material 208 and second current collector material 106 are deposited, as shown in FIG. 2, a photoresist layer (not shown) may be spun on top, patterned/exposed and developed. On the areas 402 where there should be no cathode material both cathode electrode layer 208 and second current collector layer 106 may be etched away (dry or wet-chemical etching) and finally, after etching is complete, the residual photoresist layer may be removed. Furthermore, according to this embodiment of the present invention, during the etching step described above, portions of the solid-state electrolyte layer 206 and the anode electrode layer 204 may also be removed around the perimeter of battery array 300 to provide the stair step pattern 404 shown in FIG. 4 along each side of battery array 300. In other words, cathode electrode layer 208, electrolyte layer 206 and barrier layer 202, which also acts as a first current collector 108 for the anode, are progressively offset from one another in the horizontal dimension at each perimeter edge of battery array 300. This stair step pattern 404, advantageously, significantly reduces the resistivity for the first current collector layer (barrier layer 202). For example, TiN has much lower resistivity than silicon substrate (~100 microohm-cm vs. 1 ohm-cm). Furthermore, stair step pattern 404 advantageously reduces leakage around the perimeter of battery array 300 because cathode electrode layer 208 is horizontally offset from the electrolyte layer 206, as shown in FIG. 4.

Referring back to FIG. 3, the present invention contemplates a fuse connection structure integrated with the battery. Advantageously, the present invention allows for the formation of the fuse connection structure during normal interconnect process flows, advantageously reducing processing costs for manufacturing fuses which are normally fabricated in different process flows. Fuse connection structure depicted in FIG. 3 comprises a plurality of substantially parallel fuse wires 320, 322, and 324 interconnecting sub-arrays in each row of the array 300. In other words, fuse wire 320 interconnects sub-arrays 314, 316, and 318 in the top row, fuse wire 322 interconnects sub-arrays 308, 310, and 312 in the middle row, and fuse wire 324 interconnects sub-arrays 302, 304, and 306 in the bottom row. The fuse connection structure depicted in FIG. 3 further comprises interconnect wire 326 that connects fuse wires 320, 322, and 324. Preferably, fuse wires 320 through 326 are of the same material as second current collector layer 106 previously described. It should be noted that barrier layer 202 and electrolyte layer 206 are shown in FIG. 3 to illustrate the stair step pattern described above in conjunction with FIG. 4.

In various embodiments of the present invention two types of fuses may be used. In one type, the fuse may be blown using an external heat source, for example, a laser beam. In a second type, an electrical current may be flowed through the fuse wire to blow the fuse. The latter type, electrical fuse (E-fuse), is preferred because the fuse blow operation can be automated in conjunction with a battery test.

The solid-state battery depicted in FIG. 3 may be tested for defects prior to packaging. It is known in the art to use battery test equipment to test every cell 104 of battery array 300. Such test equipment may include, for instance, a battery tester with an integrated battery cell temperature sensor. The temperature sensor is a non-contact sensor which is capable of measuring the temperature of a particular cell 104 when positioned proximate the particular cell 104. One example of a non-contact sensor which is suitable for use with the present invention is an infrared (IR) temperature sensor. Cell temperature measurements may be carried out by aiming or directing a laser beam from the IR sensor at different points on the surface of battery. At each different point, IR radiation that is emitted from the target cell 104 is focused onto an IR detector of the sensor, which determines the temperature of the target cell 104 as a function of the radiation emitted from the target. By comparing the temperature measurements with one or more predetermined temperature thresholds, the battery tester may indicate whether an open circuit condition, short circuit condition, and the like is present in any of the cells 104 within battery cell array 300. It is also to be understood that alternative methods of testing battery cells 104 may be employed.

Once sub-arrays with one or more defective battery cells are identified, a fuse blow operation may be performed to disconnect defective sub-arrays from the battery array 300. For purposes of illustration, assume that only one defective cell 104 was detected in sub-array 312. Fuse wire 322 may be blown by either using an external heat source, such as laser beam, or by flowing an high voltage electrical current through the fuse wire 322. Fuse wire 322 evaporates or melts under the influence of a high voltage current. It should be noted that in this embodiment sub-arrays 308 and 310 will be eliminated along with sub-array 312, even though they did not contain any defective cells, because the entire fuse wire 322 is blown.

FIG. 5 illustrates a top view of a solid-state battery structure in accordance with another embodiment of the present invention. In this embodiment, the fuse connection structure comprises a first plurality of substantially parallel fuse wires 502 extending along each row of the array 300. The fuse connection structure further comprises a second plurality of fuse wires 504 which are connecting the first plurality of wires 502 with corresponding sub-arrays 302 through 318. As shown in FIG. 5, each sub-array 302 though 318 may be connected to first plurality of wires 502 by a corresponding individual connection 504. This structure allows for access to each sub-array 302 through 318 separately. Thus, this embodiment of the present invention allows for elimination of only that sub-array which contains one or more defective battery cells 104 (for example, sub-array 316) by blowing fuse wire 504 which connects sub-array 316 with fuse wire 502.

Figure 6:
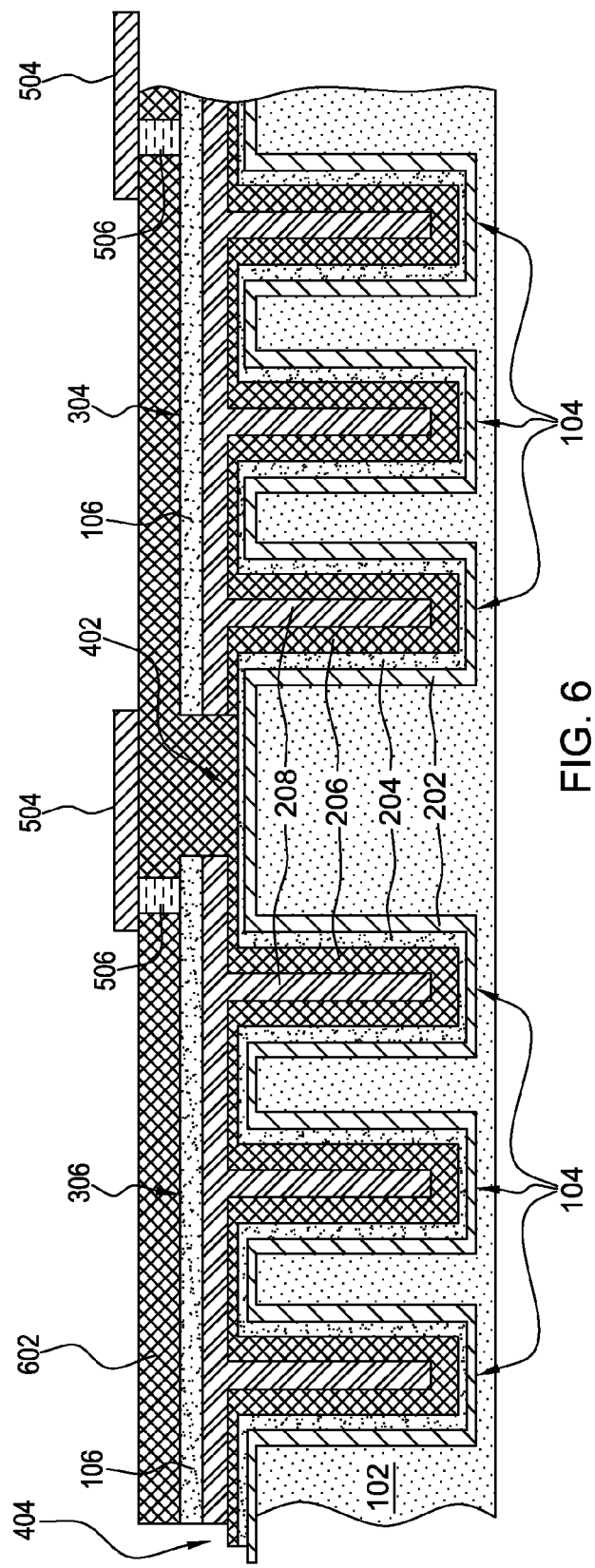
FIG. 6 illustrates a cross-section view of the solid-state battery structure of FIG. 5.

FIG. 6 illustrates a cross-section view of the solid-state battery structure of FIG. 5. In this embodiment, the fuse connection structure comprises a multilevel metal interconnect structure. This structure may be formed by first depositing a layer of any suitable electrically insulating material 602 so as to cover second current collector layer 106. Subsequently, vias 506 may be formed in the dielectric layer 602 by etching holes 506 using Reactive Ion Etch (RIE), and filling the holes 506 with tungsten (W), aluminum (Al), or other suitable metal. After this step, fuse wires 504 may be formed on the insulation layer 602, so that fuse wires 504 are electrically connected to second current collector layer 106 by vias 506, as shown in FIG. 6. Fuse wires 502 and 504 are preferably made of aluminum. It should be noted that in this embodiment an additional level of fuse wires is used in the fuse connection structure which requires additional process steps.

FIG. 7 illustrates a top view of a solid-state battery structure in accordance with yet another embodiment of the present invention. In this embodiment, the fuse connection structure is similar to fuse connection structure shown in FIG. 5. According to this embodiment, the fuse connection structure comprises a first plurality of substantially parallel fuse wires 702 extending along each row of the array 300. The fuse connection structure further comprises a second plurality of fuse wires 704 which are connecting the first plurality of wires 702 with corresponding sub-arrays 302 through 318. As shown in FIG. 7, each sub-array 302 though 318 may be connected to first plurality of wires 702 by a corresponding individual connection 704. However, in this embodiment the fuse wire structure comprises only one layer of wiring. Both first plurality of wires 702 and second plurality of wires 704 are positioned between sub-arrays 302 through 318. Preferably, the sub-arrays 302 through 318 are spaced apart by a distance of approximately 0.5-10 µm, and preferably approximately 1 µm. On the other hand, the present embodiment does not involve additional process steps to form the second layer of wiring.

Figure 8:
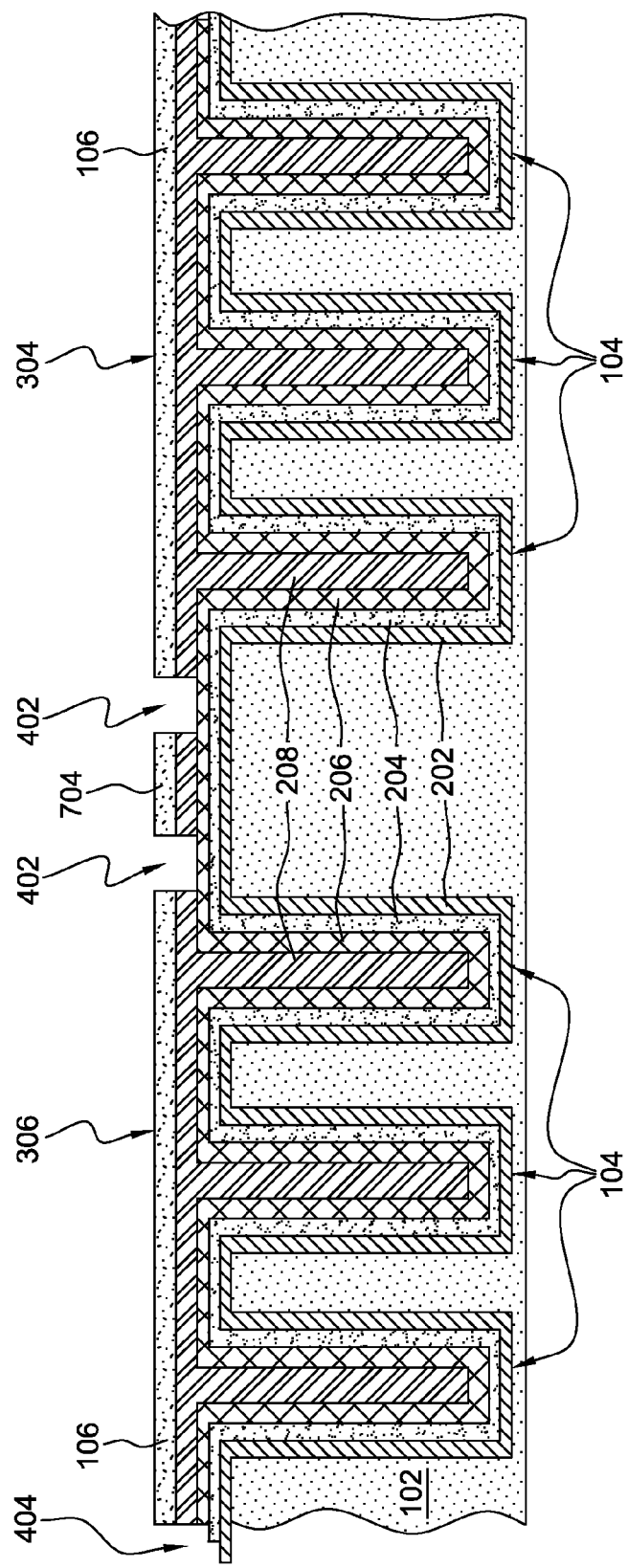
FIG. 8 illustrates a cross-section view of the solid-state battery structure of FIG. 7.

FIG. 8 illustrates a cross-section view of the solid-state battery structure of FIG. 7. As shown in FIG. 8, fuse wires 704 may be formed by using conventional lithography and etching of cathode layer 208 and second current collector layer 106 (as described above). In this embodiment, second current collector layer 106 is the top metal layer.

Thus, as described above, the present invention relates to a structure and a method of forming a solid-state battery on a substrate. Various embodiments of the present invention provide a plurality of fuse wires that is integrated with the array of battery cells. The battery may be tested for defects prior to packaging. Advantageously, a fuse blow operation may be performed to disconnect only a portion of the array (one or more sub-arrays) containing the defective battery cells. Thus, the present invention provides an improved yield and reliability as compared to the prior art. In addition, the present invention allows the formation of fuse connection structure during normal interconnect process flows, advantageously reducing processing costs for manufacturing fuses which are normally fabricated in different process flows. Furthermore, stair step pattern 404 formed at each perimeter edge of battery array 300 advantageously reduces current leakage around the perimeter of battery array 300.

Figure 9:
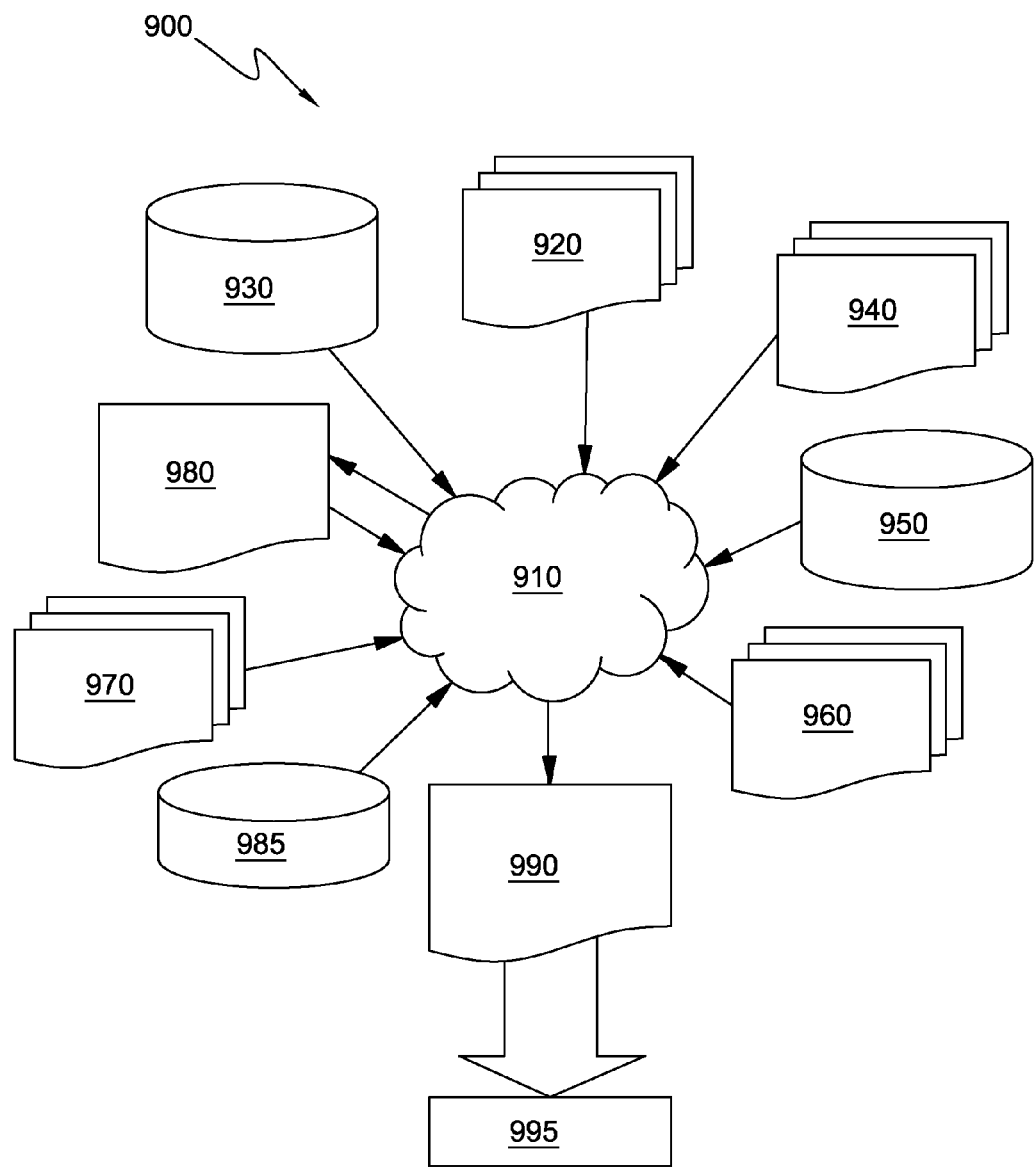
FIG. 9 is a flow diagram of a design process used in semiconductor design, manufacture, and/or test.

FIG. 9 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 3-8. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., e-beam writers), computers or equipment for simulating design structures, any apparatus used in the manufacturing or test process, or any machines for programming functionally equivalent representations of the design structures into any medium (e.g., a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD), such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, such as those shown in FIGS. 3-8. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages, such as Verilog and VHDL, and/or higher level design languages, such as C or C++.

Design process 910 preferably employs and incorporates hardware and/or software modules for synthesizing, translating, or otherwise processing a design/simulation functional equivalent of the components, circuits, devices, or logic structures shown in FIGS. 3-9 to generate a netlist 980 which may contain design structures, such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium, such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes, such as stress analysis, thermal analysis, mechanical event simulation, process simulation for operations, such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes, such as timing analysis, verification, design rule checking, place and route operations, etc.

Design process 910 employs and incorporates logic and physical design tools, such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 3-8. In an embodiment, design structure 990 may comprise a compiled, executable HDL simulation model that functionally simulates the devices shown in FIGS. 3-8.

Design structure 990 may also employ a data format used for the exchange of layout data of integrated circuits and/or symbolic data format (e.g., information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 3-8. Design structure 990 may then proceed to a stage 995 where, for example, design structure 990 proceeds to tape-out, is released to manufacturing, is released to a mask house, is sent to another design house, is sent back to the customer, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A battery structure comprising:
   a substrate;
   a plurality of battery cells formed in the substrate;
   a patterned cathode electrode layer formed upon the substrate and structured to form a plurality of sub-arrays of the battery cells; and
   a patterned fuse layer formed above the cathode electrode layer comprising a plurality of fuse wires structured to interconnect at least two adjacent sub-arrays, wherein at least one of the plurality of fuse wires is structured to be blown to disconnect an interconnection having a defective sub-array.

2. The battery structure of claim 1, wherein each of the battery cells comprises a barrier layer, an anode electrode layer, and an electrolyte layer separating the anode electrode layer and the patterned cathode electrode layer.

3. The battery structure of claim 2, wherein the plurality of sub-arrays are arranged in an array having rows and columns.

4. The battery structure of claim 3, wherein the patterned cathode electrode layer, the electrolyte layer and the barrier layer are arranged in a substantially stair step pattern along each side of the array.

5. A battery structure comprising:
   a substrate;
   a plurality of battery cells formed in the substrate;
   a patterned cathode electrode layer formed upon the substrate and structured to form a plurality of sub-arrays of the battery cells; and
   a first patterned fuse layer formed above the cathode electrode layer comprising a first plurality of fuse wires structured to interconnect the sub-arrays, wherein at least one of the first plurality of fuse wires is structured to be blown to disconnect a single defective sub-array.

6. The battery structure of claim 5, wherein the plurality of sub-arrays are arranged in an array having rows and columns.

7. The battery structure of claim 6, further comprising a second patterned fuse layer formed above the cathode electrode layer comprising a second plurality of fuse wires, wherein the first plurality of fuse wires extends along each row of the array and the second plurality of fuse wires is arranged so as to electrically connect each of the sub-arrays to the first plurality of fuse wires.

8. The battery structure of claim 7, wherein the first plurality of fuse wires are formed between the rows of the array and wherein the second plurality of fuse wires are formed between the columns of the array.

9. A method of forming a battery structure comprising:
    forming a plurality of battery cells in a substrate;
    forming a cathode electrode layer overlying the plurality of battery cells;
    patterning the cathode electrode layer to define a plurality of sub-arrays of the battery cells;
    forming a fuse layer above the cathode electrode layer; and
    patterning the fuse layer to form a plurality of fuse wires structured to interconnect at least two adjacent sub-arrays, wherein at least one of the plurality of fuse wires is structured to be blown to disconnect an interconnection having a defective sub-array.

10. The method of claim 9, wherein forming the plurality of battery cells comprises:
    forming a plurality of trenches having sidewalls and a bottom in the substrate;
    forming a barrier layer on the sidewalls and the bottom of the plurality of trenches and upon a surface of the substrate between the plurality of trenches;
    forming an anode electrode layer overlying the barrier layer;
    forming an electrolyte layer overlying the anode layer; and
    forming the patterned cathode electrode layer overlying the electrolyte layer.

11. The method of claim 10, wherein patterning the cathode electrode layer further comprises arranging the plurality of sub-arrays in an array having rows and columns.

12. The method of claim 11, further comprising forming a first horizontal offset between the patterned cathode electrode layer and the electrolyte layer and forming a second horizontal offset between the electrolyte layer and the barrier layer along each side of the array.

13. A method of forming a battery structure comprising:
    forming a plurality of battery cells in a substrate;
    forming a cathode electrode layer overlying the plurality of battery cells;
    patterning the cathode electrode layer to define a plurality of sub-arrays of the battery cells;
    forming a fuse layer above the cathode electrode layer; and
    patterning the fuse layer to form a plurality of fuse wires structured to interconnect the sub-arrays, wherein at least one of the plurality of fuse wires is structured to be blown to disconnect a single defective sub-array.

14. The method of claim 13, wherein patterning the cathode electrode layer further comprises arranging the plurality of sub-arrays in an array having rows and columns.

15. The method of claim 14, wherein patterning the plurality of fuse wires further comprises patterning a first plurality of fuse wires arranged substantially parallel to each other along each row of the array and patterning a second plurality of fuse wires arranged so as to electrically connect each of the sub-arrays to the first plurality of fuse wires.

16. The method of claim 15, further comprising forming a plurality of substantially vertically aligned electrically conductive vias to connect each of the second plurality of fuse wires to a corresponding sub-array.

17. The method of claim 15, wherein the first plurality of fuse wires are patterned between the plurality of rows of the array and wherein the second plurality of fuse wires are patterned between the plurality of columns of the array.

18. A design structure tangibly embodied in a machine readable medium for designing, manufacturing, or testing an integrated circuit, the design structure comprising:
    a substrate;
    a plurality of battery cells formed in the substrate;
    a patterned cathode electrode layer formed upon the substrate and structured to form a plurality of sub-arrays of the battery cells; and
    a patterned fuse layer formed above the cathode electrode layer comprising a plurality of fuse wires structured to interconnect at least two adjacent sub-arrays, wherein at least one of the plurality of fuse wires is structured to be blown to disconnect an interconnection having a defective sub-array.

* * * * *